United States Patent Office 2,827,605
Patented Mar. 18, 1958

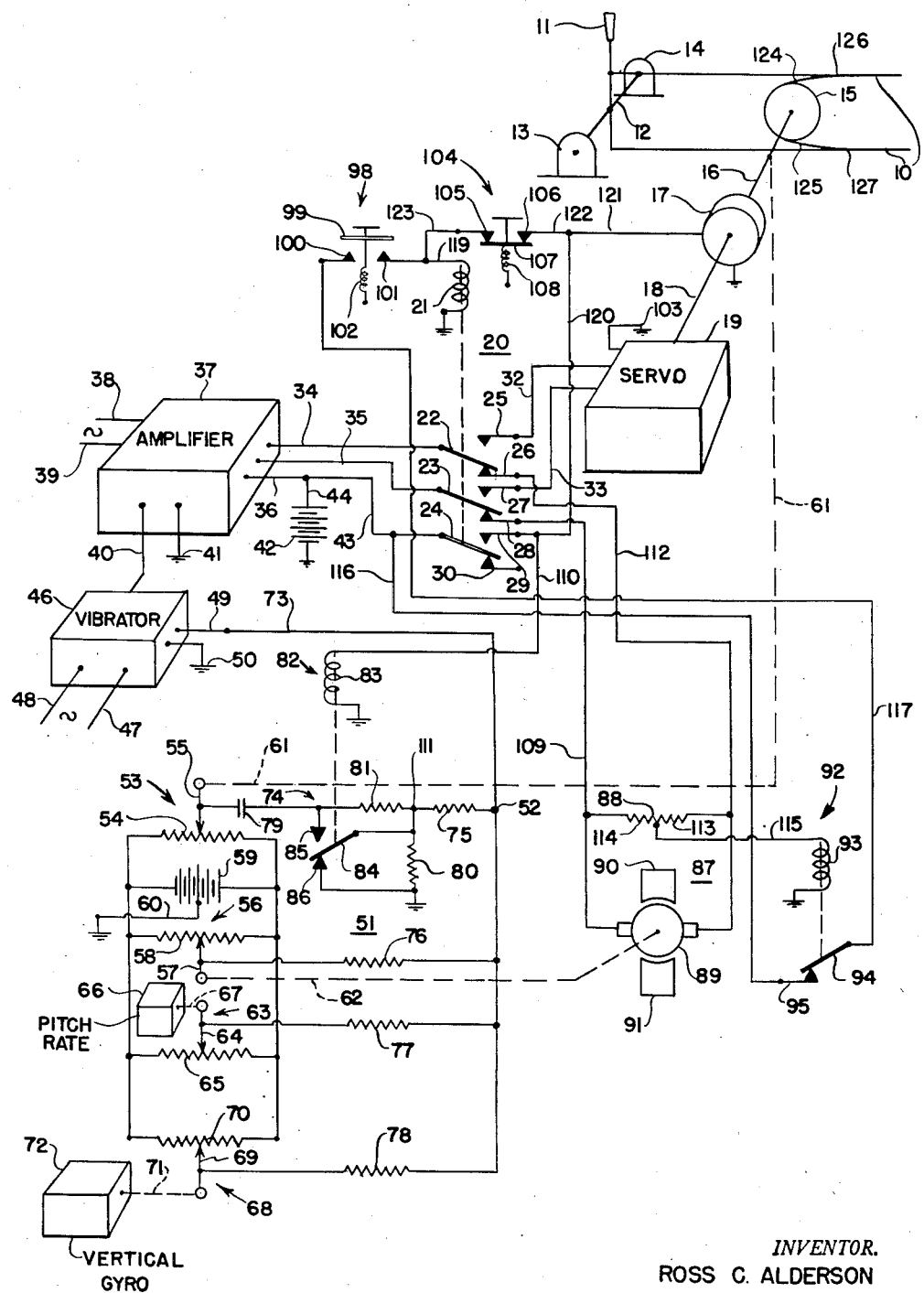

2,827,605

AUTOMATIC PILOTS

Ross C. Alderson, St. Louis Park, Minn., assignor to Minneapolis-Honeywell Regulator Company, Minneapolis, Minn., a corporation of Delaware Application October 6, 1951, Serial No. 250,081

7 Claims. (Cl. 318—489)

This invention pertains to automatic steering mechanisms for aircraft which are generally referred to as automatic pilots. An aircraft is controlled about its roll, turn, and pitch axes from the automatic pilot by means of its operative connection with the control surfaces of the craft. When the automatic pilot is not operatively connected with the control surfaces, the control surfaces may be manually displaced to control the craft about its three axes.

Automatic pilots oftentimes include a rebalancing system or balanceable electrical network including, for simplicity, an automatic craft attitude controller responsive to departure of the craft from level position and a follow-up controller with the latter being positioned with the control surface. Manual displacement of the control surface to place the craft in a level flight position is accompanied by operation of the follow-up controller resulting in unbalance of the balanceable network. If the automatic pilot is operatively connected to the control surface with the network as now unbalanced, such unbalance effects operation of the surface causing a lurch of the craft which it is desirable to avoid. In order to maintain the network balanced while the control surface is being manually controlled, a synchronizing or centering motor is provided which operates in accordance with the unbalance of the network to maintain it balanced.

In the present instance, instead of the follow-up controller being operated in accordance with the craft surface displacement, the network includes a controller responsive to the rate of control surface displacement. When the control surface of the aircraft is being manually and continuously displaced to maintain level flight attitude as in turbulent air conditions, the network is continuously unbalanced since there is a time delay between movement of the control surface to unbalance the network and operation of the synchronizing controller to rebalance the network.

Also, since the synchronizing controller signal is opposed to a signal proportional to rate of surface displacement which latter is absent when the control surface position does not change, the synchronizing controller must thereafter be moved to a new position to balance the network resulting in further delay in reaching network balance. The absence of such rate of surface displacement signal is advantageous during automatic control since during steady state conditions when the surface is not moved continuously, the automatic attitude control signal will cause the craft to fly in a level position despite a permanent disturbing force which tends to change craft attitude.

Operative connection of the automatic pilot with a control surface for automatic operation thereof however is desirable only when the network related to a control surface is in balanced condition, as evident from a previous discussion.

It is an object therefore of this invention to provide a novel arrangement to maintain a network of an automatic pilot in balanced condition during manual operation of a control surface related to said network.

It is a further object of this invention to provide in an automatic control apparatus having a balanceable network a controller positioned with a condition controlling device, such as a control surface of an aircraft, which is operated by said apparatus or is manually operable with the controller ineffective to effect the balance of the network during manual operation of said device.

It is a further object of this invention to provide novel means to effect rapid association of a condition controlling device such as a control surface of an aircraft with automatic stabilizing apparatus and wherein during non-association of said apparatus and control device manual operation of said device may be effected to modify said condition.

It is a further object of this invention to provide a balanceable control apparatus having a controller positioned with a condition controlling device, which device may be alternatively manually positioned, of means for removing the effect of said controller on said apparatus while said surface is being manually positioned.

It is a further object of this invention to provide a balanceable control apparatus having a plurality of controllers one controller being adjusted according to a condition to be maintained and another according to a condition control device position and wherein the condition control device may also be manually positioned and wherein unbalance of said balanceable apparatus by manual adjustment of said device is automatically restored wherein further provisions are effective during said manual operation to render ineffective the controller positioned with said contol device.

The above and further objects and features of the invention will appear more fully hereinafter from a consideration of the following description taken in conjunction with the accompanying drawing wherein one embodiment of the invention is illustrated by way of example.

The drawing is a schematic view of the alternative manual and automatic arrangement for operating a control surface of an aircraft.

Referring to the drawing, the arrangement provides for operation of the elevator control surface (not shown) of the aircraft by means of operating cables 10 connected to a manually operable control stick 11 whereby the elevator may be displaced upwardly or downwardly from a normal position. Alternatively the cables 10 may be operated by a servomotor 19 through a magnetic clutch 17. The servomotor 19 is reversibly controlled by an elevator servomotor amplifier 37. The direction of rotation of the servomotor depends upon the phase relationship of two alternating voltages one being that from the source of supply applied across connections 38, 39 and that applied across signal input connections 40, 41. The source of control signal voltage is derived from a balanceable direct voltage network 51 whose resultant voltage is applied to a DC to AC converter 46. The output of the converter 46 is applied across the input connections 40, 41 of amplifier 37. Signals are generated in network 51 in accordance with the position of the control surface by operating means 61, by a synchronizing means in accordance with operating member 62, in accordance with pitch rate by an operating means 67, and in accordance with pitch attitude by an operating means 71. The synchronizing operator 62 is positioned from a synchronizing motor 87. Operative connection between the servomotor 19 and drum 15 for operating cables 10 is effected by a magnetic clutch 17. An engage relay 20 serves to couple servo amplifier 37 with servomotor 19 and simultaneously energizes clutch 17. When the servomotor is disconnected from its cable drum 15 and its amplifier 37, the amplifier 37 controls the synchronizing motor 87. Thus, during manual changes in attitude by the operation of control stick 11, changes in the pitch attitude of the aircraft which are sensed by vertical gyro 72 to unbalance network 51 result in operation of the synchronizing motor 87 to rebalance network 51. During manual operation of the control stick 11, a signal voltage derived from movement of the follow-up member 61 is rendered ineffective in the network 51. This permits more rapid rebalancing of network 51 since the synchronizing motor 87 is made responsive only to control signals derived from movements of the aircraft in its entirety and is not controlled by the operation of the control surface distinct from movements of the aircraft. Since it is undesirable to permit automatic operation of the servomotor 19 until network 51 has been rebalanced during operation of the control stick 11, a relay 92 is energized during operation of the synchronizing motor 87 to prevent energization of the engage relay 20 which latter serves to couple the servomotor with its cable drum and with the amplifier 37.

Having considered generally the broad aspects of the present invention, for a clearer understanding of the means whereby such broad objects are attained reference is made to the following detailed description. The control stick 11 which operates elevator cables 10 is pivotable about an axis 12 parallel with the pitch axis of the aircraft. The axis 12 is supported by bearings 13, 14 supported by the aircraft. Cable drum 15 is supported on servo output shaft 16 and the drum supports secondary cables 124, 125 extending therefrom with the secondary cables being secured to main cables 10 by suitable clamping means 126, 127. The output shaft 16 is operatively engaged with motor drive shaft 18 through magnetic clutch 17. The servomotor 19 is of a type well known in the art and is of the reversible DC type comprising a center tap field winding, a pulsing clutch winding, and an armature with the armature and clutch winding connected in series to the center tap of the field winding. The direction of rotation of the motor is dependent upon which half of the center tap field winding is connected in the motor circuit. When neither field winding of the motor is energized a brake holds the drive shaft 18 against rotation. The motor thus may be of the type disclosed in Patent 2,267,114 to Lear et al. The free end of one half of the motor winding is connected by conductor 32 to an in contact 25 of relay 20 and the free end of the other half of motor winding is connected by a conductor 33 to an in contact 27 of relay 20. Relay 20 additionally includes a third in contact 29. Relay 20 includes an operating winding 21 for actuating relay arms 22, 23, and 24. These arms are normally engaged with their respective out contacts 26, 28, and 30. Contacts 25, 26; 27, 28; 29, 30 are associated respectively with arms 22, 23, and 24.

The servomotor amplifier 37 is of the AC discriminator type similar to that disclosed in Patent 2,425,734 to Willis H. Gille et al. Amplifier 37 includes two DC output connections 34, 35; a DC input connection 36; alternating power input connections 38, 39 extending from a source of alternating voltage; and signal input connections 40, 41. The amplifier conventionally includes a pair of relays which are alternatively operated depending upon the phase relationship of the output voltage across terminals 38, 39 with respect to the input signal across connections 40, 41. The relays, depending on which one is energized, serve to couple conductor 36 with output conductors 34 or 35.

The DC to AC converter 46 may be a conventional vibrator having a winding energized by connections 47, 48 extending from the alternating voltage source. The unidirectional signal voltage is applied across conductors 49, 50 extending from vibrator 46. The output of the vibrator therefore is of the same frequency as the source voltage and the output is connected to amplifier input terminals 40, 41.

A conductor 73 extends from vibrator input connection 49 to a summing point 52 of a parallel DC summing network 51. Network 51 comprises a plurality of sources of control signals comprising a follow-up signal generator 53, a synchronizing signal generator 56, a pitch rate signal generator 63, and a pitch attitude signal generator 68. Generator 53 comprises a resistor 54 and a slider 55 with the resistor connected across a source of DC voltage 59 having a grounded center tap connection 60. Slider 55 is adjusted along resistor 54 in either direction from the midpoint thereof by a follow-up connection 61 connected to output shaft 16 of motor 19. Thus upon movement of slider 55 from the midposition shown, a voltage appears between slider 55 and ground, the polarity of the voltage being dependent upon the direction of displacement of slider 55. Signal generator 56 comprises a slider 57 and a resistor 58 connected across source 59 in parallel with resistor 54. Slider 57 is adjusted along resistor 58 in either direction from the midpoint thereof by a suitable operating connection 62 extending from a synchronizing motor 87 and thus similarly produces a voltage between slider 57 and ground. Signal generator 63 comprises a slider 64 and a resistor 65 connected across voltage source 59. Slider 64 is positioned along resistor 65 by a pitch rate gyroscope 66 through a suitable operating means 67. Signal generator 68 comprises a slider 69 and a resistor 70 connected across voltage supply 59. Slider 69 is positioned along resistor 70 in either direction from the midpoint thereof through a suitable operating connection 71 extending from a vertical gyroscope 72.

The vertical gyroscope 72 is of the type well known in the art whose rotor has three axes of angular freedom. The rotor spin axis is maintained in a perpendicular relationship with respect to the earth's surface and the casing within which the rotor is mounted for rotation is cross trunnioned so as to be rotatable about two respectively horizontal axes. The gyroscope is so arranged in the aircraft that upon changes in pitch attitude, the slider 69 will be adjusted relative to resistor 70. The pitch rate gyroscope 66 is of the conventional type whose rotor has two axes of angular freedom. Angular freedom about an axis of precession which is at right angles to the rotor spin axis is opposed by restraining means. The gyroscope 66 is so mounted in the craft that upon change in attitude of the craft about its pitch axis, slider 64 will be moved relative to resistor 65 in accordance with the rate of change of pitch attitude. The direction in which slider 64 moves relative to the midpoint of resistor 65 depends upon the direction in which the pitch attitude is changing.

Associated with signal generators 53, 56, 63 and 69 are corresponding summing resistors 75, 76, 77, and 78. Resistors 76, 77, and 78 are interposed respectively between sliders 57, 64, and 69 and the summing point 52 of network 51 so that the voltages between sliders 57, 64, and 69 and ground are impressed through the summing resistors between point 52 and ground. One end of the remaining summing resistor 75 is connected to the summing point 52 but intermediate the remaining end of resistor 75 and its related slider 55 is a derivative network 74. The derivative network 74 comprises a capacitor 79 and a resistor 80. Essential to the present invention and associated with the derivative network 74 is a shunting resistor 81 and a switching arrangement 82. Capacitor 79, resistor 81, and summing resistor 75 are connected in series across slider 55 and summing point 52. Resistor 80 is connected from junction 111 of resistors 81 and 75 to ground. Switching arrangement 82 may be a single pole double throw relay having an operating winding 83, an arm 84, in contact 85, and out contact 86. In contact 85 is connected to the junction of capacitor 79 and resistor 81. Arm 84 is connected to junction point 111, and out contact 86 is connected to ground. With arm 84 engaging in contact 85 operation of slider 55 results in a change in the voltage across capacitor 79 causing a flow of current thereto. This current appears as a voltage drop across resistor 80 as the signal which is a function of the rate of change of position of slider 55 relative to resistor 54. This voltage is applied to network 51 through summing resistor 75. Alternatively with the arm 84 engaging the out contact 86, junction 111 is at ground potential and irrespective of the movement of slider 55 no voltage is applied to the network 51.

Reverting to the synchronizing motor 87, this motor is of the direct current reversible type having permanent magnets 90 and 91 for supplying a field for armature 89. Across armature 89 is connected a center tapped resistor 88 having portions 113, 114. Connected to the center tap of motor resistor 87 is a conductor 115 which extends to an operating winding 93 of an anti-engage relay 92. Relay 92 is of the single pole single throw type having an arm 94 and an out contact 95.

Engagement of the automatic control apparatus with the elevator is effected by a manually operable engage switch 98 of the normally opened momentarily closed type having a bridge member 99 coacting with contacts 100, 101. Member 99 is biased to open position by a spring 102 extending therefrom to a fixed part of the switch structure. Disengagement of the automatic control apparatus with the elevator is provided by a manually operable disengage switch 104 of the normally closed momentarily opened type having contacts 105, 106 which are engaged by a bridge member 107 biased to closed position by a suitable spring means 108 between said member and a stationary part of the switch structure.

In operation, the automatic control apparatus is in a condition wherein the servomotor 19 is isolated from cable drum 15 by de-energization of clutch 17 with the relay 20 in unoperated condition as shown. Under these conditions, the amplifier 37 is associated with the synchronizing motor 87 through out contacts of relay 20. The elevator control surface may be directly manually actuated from control stick 11 until the aircraft has reached a predetermined altitude and attitude. Any change in attitude of the aircraft resulting from manual operation of the control stick 11 is sensed by the vertical gyroscope 72 which operates slider 69. The pitch rate gyroscope also operates slider 64 in signal generator 63. Although movement of the control stick 11 adjusts output shaft 16, movement of slider 55 in signal generator 53 is noneffective to produce a signal in network 51 since relay arm 84 engages its out contact 86 whereby resistor 80 is shunted. Signals arising in network 51 from the signal generators 63 and 68 are applied across input connections 49 and 50 of vibrator 46. This unidirectional control signal is converted to alternating voltage having the same frequency as that of the source of supply across terminals 38, 39 of amplifier 37. One or the other of the relays in amplifier 37 is operated depending upon the phase relationship of the signal voltage from vibrator 46 applied across amplifier connections 40, 41 with respect to the power voltage across connections 38, 39. If one relay is operated, D. C. voltage is led from battery 42, through conductor 44, amplifier input conductor 36, amplifier output conductor 34, relay arm 22, out contact 26, conductor 112, through parallel paths comprising resistor portion 113 or armature 89 and resistor portion 114 to the center tap of resistor winding 88, conductor 115, operating winding 93 of the anti-engage relay 92 to ground and return to battery 42. The energization of the synchronizing motor 87 causes it to adjust slider 57 so that signal generator 56 applies a voltage which balances network 51. If the phase of the control signal across input connections 40, 41 with respect to the voltage across power connections 38, 39 be of opposite phase, voltage is applied from battery 42, conductor 44, amplifier input connecton 36, amplifier output connection 35, relay arm 23, out contact 28, conductor 109, through parallel paths comprising resistor portion 114 or armature 89 and resistor portion 113, to the center tap of motor resistor 88, thence through conductor 115, winding 93 of relay 92 to ground and return to battery 42. Synchronizing motor 87 is energized to rotate in the opposite direction to position slider 57 until a signal is generated to rebalance network 51. Thus during the time that the control stick 11 is used to operate the elevator control surface, network 51 is continually maintained in a balanced condition so that if it be desired to apply automatic control to the elevator, the apparatus may be immediately connected to the control surface while the network is in a balanced condition.

To effect automatic control of the elevator control surface, the engage switch 98 is momentarily held in closed position. The engage circuit extends from battery 42 through conductor 44, conductor 43, conductor 116, relay out contact 95, relay arm 94, conductor 117, switch contact 100, switch member 99, switch contact 101, conductor 119, operating winding 21 to ground, and return to battery 42. With the relay operating winding 21 energized a holding circuit is completed extending from battery 42 through conductor 44, conductor 43, relay arm 24, in contact 29, conductor 120, conductor 122, disengage switch contact 106, bridge member 107, switch contact 105, conductor 123, conductor 119, operating winding 21, to ground and return to battery 42. With the establishment of this holding circuit, a circuit is also completed for energizing magnetic clutch 17 extending from energized conductor 120, conductor 121, magnetic clutch 17 to ground and return to battery 42. With the relay 20 operated, a circuit is further completed extending from energized in contact 29, conductor 110, operating winding 83 of relay 82 to ground and return to battery 42. The operation of relay 82 causes arm 84 to engage in contact 85 thereby connecting the derivative network 74 between slider 55 and ground conductor 60 of voltage source 59. With the relay 20 energized, amplifier output conductors 34, 35 are associated with the ends of servomotor field winding and the synchronizing motor 87 is effectively disconnected from amplifier 37.

With the network 51 in balanced condition due to previous operation of synchronizing motor 87 and slider 57, any subsequent change in pitch attitude of the aircraft will be detected by the vertical gyroscope 72. Gyroscope 72 will operate slider 69 of signal generator 68 to unbalance network 51. This unidirectional voltage from network 51 is converted to alternating voltage by vibrator 46 and applied across amplifier signal input connections 40, 41. The phase of this voltage relative to the reference voltage across connections 38, 39 depends upon the direction of change of attitude of the craft. The amplifier 37, if the change in pitch attitude is in one direction, applies direct voltage from its output conductor 34, through relay arm 22, in contact 25, conductor 32 to one-half of the motor field winding, through the motor clutch winding, motor armature through conductor 103 to ground and return to battery 42. The servomotor operates drum 15 and cables 124, 125 to position the main cables 10 and displace the elevator control surface. Movement of the shaft 16 is also communicated by follow-up connection 61 to slider 55. A signal is thus generated between slider 55 and the center tap conductor 60 of D. C. supply 59. This voltage is applied across the derivative network 74 and a voltage dependent upon the rate of change of control surface position is applied to network 51 which opposes the signal from generator 68 due to operation of slider 69.

If the change in attitude is of the opposite direction, the amplifier output conductor 35 will be energized to supply voltage through relay arm 23, in contact 27, conductor 33, to the other portion of motor field winding, through the clutch winding, through the motor armature conductor 103 to ground and return to battery 42. The servomotor rotates in the opposite direction to operate the elevator and concurrently move slider 55 in follow-up signal generator 53 in the opposite direction. Thus a signal is applied to network 74 which modifies the same to apply an output voltage across resistor 80 which is a function of the rate of change of control surface movement. The polarity of the voltage across resistor 80 is dependent upon the direction in which the control surface is being operated.

If a permanent disturbing force, such as a change in the position of the center of gravity, tends to change the level attitude of the aircraft a steady state error from this level position during which the surface is still would result in a control signal from the attitude controller but not from the surface position controller so that the surface would be displaced additionally until the craft is level.

If desired, the pilot may thereafter again utilize the control stick 11 to manually position the elevator control surface. In preparation for manual operation, the pilot operates the disconnect switch 104 which breaks the energizing circuit for winding 21 between contacts 105, 106 so that the engage relay 20 drops to the out position shown. During subsequent operation of the elevator by the control stick 11, the synchronizing motor 87 maintains network 51 in a balanced condition. At this time, the circuit for energizing winding 83 of relay 82 is broken, and relay arm 84 drops to the out position shown whereby resistor 80 of the derivative network 74 is bypassed.

The desirable objects obtained by bypassing resistor 80 will become clear from the following operation. If the aircraft is encountering turbulent air, the pilot may, in order to maintain the craft in a level flight position, be continuously operating the elevator upwardly and downwardly about a mean position. If resistor 80 were not bypassed at this time, the continuous operation of the control surface which is accompanied by the continuous adjustment of slider 55 would result in a continuous voltage existing across resistor 80 of derivative network 74. This continuously changing voltage across resistor 80 would unbalance network 51 and result in continuous operation of synchronizing motor 87 in order to balance network 51. With the synchronizing motor 87 seeking to maintain network 51 balanced which would involve its continuous operation, the operating winding 93 of anti-engage relay 92 would be energized thereby breaking the engage circuit between out contact 95 and relay arm 94. The pilot therefore would not be able to, by mere operation of engage switch 98, obtain immediate engagement of the automatic control apparatus with the elevator control surface. It would be necessary for him to await the rebalance of network 51 by operation of synchronizing motor 87 which might not be quickly obtained in turbulent air and might under violent conditions be never actually attained.

However with the relay 82 providing a shunting circuit for resistor 80, and with the elevator being operated to maintain the craft in a level attitude, the synchronizing motor 87 merely has to balance changes in attitude of the aircraft if such occur and does not have to follow the operation of the elevator control surface. Since we are primarily concerned with aligning the automatic control system with the aircraft, the position assumed by the elevator control surface relative to the position of the aircraft is unimportant. Thus delay in engaging the automatic control system with the elevator is avoided by rendering its position ineffective or of no consequence during alignment of the control apparatus with the aircraft.

While it might be possible to render signal generator 53 ineffective during periods of synchronization of network 51 by having the operating member 61 connected to shaft 18 rather than to shaft 16, this arrangement is not as advantageous as the present arrangement because it does not assure actual operation of the elevator control surface in response to an automatic control signal.

Thus, if during automatic control, an attitude change signal is provided by signal generator 68, the amplifier 37 would effect operation of servomotor 19. However, should magnetic clutch 17 permit slippage between shafts 16 and 18 with the follow-up driven from shaft 18 network 51 could be balanced without actual operation of the elevator control surface. Thus the control apparatus would be balanced electrically but no stabilized flight would be obtained from the elevator.

If under other conditions, the control stick 11 is used to operate the elevator control surface to trim up the aircraft in a desired attitude and the control stick 11 is thereafter held to maintain this trim attitude, the movement of the stick has caused a charging of the capacitor 79 for a slight period. This charging results in a voltage across the resistor 80, in absence of the present arrangement. With the auto pilot disengaged, the synchronizing motor 87 adjusts slider 57 to balance network 51. However when the stick is held as stated, the condenser charge does not change therefore there is no current into the condenser and no voltage drop appears across resistor 80 thereafter. The centering motor 87 will now have to reverse itself to take out part of its signal. The reverse operation of the centering motor maintains the engage circuit open at out contact 95 and relay arm 94. This delays the engagement of the control apparatus with the aircraft control surface.

It will now be apparent that there has been provided in an automatic control apparatus for a control surface of an aircraft a novel synchronizing arrangement for the apparatus which permits rapid balancing of the apparatus to align the apparatus with the change in attitude of the aircraft, wherein the apparatus includes a follow-up controller the output of which is a function of the rate of operation of the control surface and wherein the control surface position rate signal generator is rendered ineffective during manual control of said surface. While the arrangement has been illustrated as applied to an elevator control surface of an aircraft, it will also appear that the principle of the invention may be applied to the control of the rudder and also the ailerons of an aircraft or simultaneously to all three control surfaces. It is therefore implicit that the invention is not restricted to the particular embodiment described but as limited by the hereunto affixed claims.

I claim as my invention:

1. Automatic control apparatus for a control surface of an aircraft which surface may be alternatively manually positioned, said apparatus comprising: motor means adapted to be selectively connected or disconnected from said surface; a balanceable voltage network operating said motor means; a signal voltage producing controller in said network positioned in accordance with a change in a condition; means including a synchronizing signal voltage producing controller in said network adapted to be operated by said network during disconnection of said motor means and surface to balance said network; a rate signal voltage producing controller in said network positioned with said surface and supplying an effect dependent on the continuous operation of said surface; means for disconnecting said motor means from said surface and from said network and for connecting said network with said synchronizing controller; and means to facilitate balancing of said network comprising means for rendering said rate signal voltage producing controller ineffective to control said network to affect balance of said network during continuous manual operation of said surface.

2. Automatic control apparatus for the control surface of an aircraft which surface may be alternatively manually positioned, said apparatus comprising: motor means adapted to be selectively connected to or disconnected from said surface; a balanceable network for operating said motor means, said network comprising a plurality of signal voltage producing controllers for supplying D. C. voltages reversible in polarity, one controller being connected in said network by a resistor capacitor network with said capacitor in series with said controller and said resistor across said controller and capacitor to provide a voltage which is a function of the rate of operation of its controller, the remaining controllers supplying signals proportional to the extent of their adjustment; means for operating said one controller in accordance with the position of said control surface; means for operating another controller in accordance with the change in attitude of said craft; and means for operating a third controller from a synchronizing motor; means for disconnecting said motor means from said surface and for connecting said network to said synchronizing motor to effect rebalance of said network; means for facilitating rebalance of said network comprising further means introduced with the disconnection of said motor for shunting said resistor during disconnection of said surface and said motor means to enable rapid rebalance of said network by said synchronizing motor during manual actuation of said control surface.

3. In apparatus for operating a control surface of an aircraft for selectively automatically controlling the attitude of an aircraft or permitting direct manual control of the craft attitude, and having an attitude sensitive device for supplying a voltage component varying in response to variations of attitude of the craft; a synchronizing means for producing a variable voltage component; a velocity type follow-up means for producing a variable voltage component in which is a function of the rate of said control surface movement; a servomotor responsive to said attitude voltage component and said follow-up voltage component for actuating said surface thereby stabilizing automatically the attitude of said craft; a means for disconnecting said servomotor from said control surface and controlling said synchronizing voltage in accordance with said attitude responsive voltage component; in combination with said apparatus: means rendering ineffective said follow-up voltage component on said synchronizing means during disconnection of said servomotor from said surface to facilitate balancing of said attitude voltage by said synchronizing voltage during manual attitude control.

4. Apparatus for automatically controlling the control surface of a craft or permitting direct manual operation thereof, said apparatus comprising a balanceable circuit comprising attitude sensing signal producing means for detecting variations of attitude of said craft; balanceable circuit signal responsive means; motor means connectable to said responsive means and operating said surface for maintaining said craft in a selected attitude; synchronizing signal producing means in said balanceable circuit adapted to be coupled to said balanceable signal circuit responsive means during disconnection of said servomotor and said surface to balance said attitude signal; signal producing means in said circuit operated in accordance with the rate of change of control surface position during manual or motor operation to modify the effect of said attitude sensing means on said responsive means; and means for rendering said last means ineffective during disconnection of said balanceable circuit signal responsive means and said servomotor to facilitate balancing of said attitude and synchronizing signals during manual surface operation.

5. Control apparatus for an aircraft having a control surface adapted to change the attitude of said craft, said apparatus comprising: a signal responsive motor controller; a servomotor adapted to be operatively connected to said surface; a synchronizing motor; means for connecting said motor controller to said servomotor during connection of said servomotor with said surface and for connecting said motor controller with said synchronizing motor during disconnection of said servomotor and surface; a balanceable electrical network; attitude sensing means; means for adjusting said network from said attitude sensing means, said synchronizing motor, and in accordance with control surface movements; and means for producing from said network during connection of said servomotor with said surface a composite unidirectional signal having components proportional to the change in attitude of said craft and the rate of change of control surface position and for producing during connection of said motor controller with said synchronizing motor a unidirectional voltage proportional to change in attitude whereby manual operation of said control surface during disconnection of said servomotor does not affect the balance of said network.

6. A condition controlling apparatus and means for synchronizing the apparatus with the condition comprising: plurality of sources of direct voltage of variable magnitude and reversible in polarity; a parallel summing network comprising a series resistor between a source of direct voltage and a summing point for a first and a second of said sources of voltage; a condenser in series with a summing resistor between a third voltage source and the summing point and a second resistor connected between a junction of said condenser and summing resistor and the midpoint of the source of voltage; means for operating the first source to vary the voltage thereof in accordance with the change in a condition; means for operating the third source in accordance with the extent of operation of a control device; motor means adapted to be connected to said control device and operated in accordance with the unbalance voltage in said summing network; synchronizing motor means alternatively operated by said network; and means for bypassing said second resistor and for controlling said second source from said synchronizing motor means during disconnection of said motor from said network and said device.

7. Control apparatus for an aircraft having a control surface that may be selectively automatically or manually operated, said apparatus comprising: a motor adapted to be operatively connected to said control surface; a synchronizing motor; an attitude responsive device; a balanceable signal voltage producing network; means connected to said device for producing a voltage in said network proportional to the change in attitude from said attitude responsive means; means operated with said surface for generating a voltage proportional to control surface movement; means connected to said network for converting said last named voltage including a derivative circuit for producing a voltage proportional to the rate of change of control surface position; means connected to the network for generating a voltage proportional to the extent of operation of said synchronizing motor; a voltage responsive control means connected with said network and operable on unbalance thereof; and means for selectively connecting said voltage responsive control means with said servomotor during connection of said servomotor with said surface to stabilize craft attitude or for alternatively connecting said voltage responsive control means with said synchronizing motor during disconnection of the servomotor and surface when manual operation of the surface may effect selected change of attitude; and further means for rendering said derivative circuit ineffective on said network during manual operation of said control surface.

References Cited in the file of this patent

UNITED STATES PATENTS

| | | |
|---|---|---|
| 2,256,875 | Wade | Sept. 23, 1941 |
| 2,376,599 | Jones | May 22, 1945 |
| 2,429,542 | Newton | Oct. 28, 1947 |
| 2,471,637 | MacCallum | May 31, 1949 |
| 2,570,905 | Young | Oct. 9, 1951 |
| 2,582,305 | Young | Jan. 15, 1952 |
| 2,589,834 | MacCallum | Mar. 18, 1952 |